Dec. 16, 1952  C. C. WAUGH  2,621,514
PHASE SHIFT TORQUE METER
Filed Aug. 15, 1947
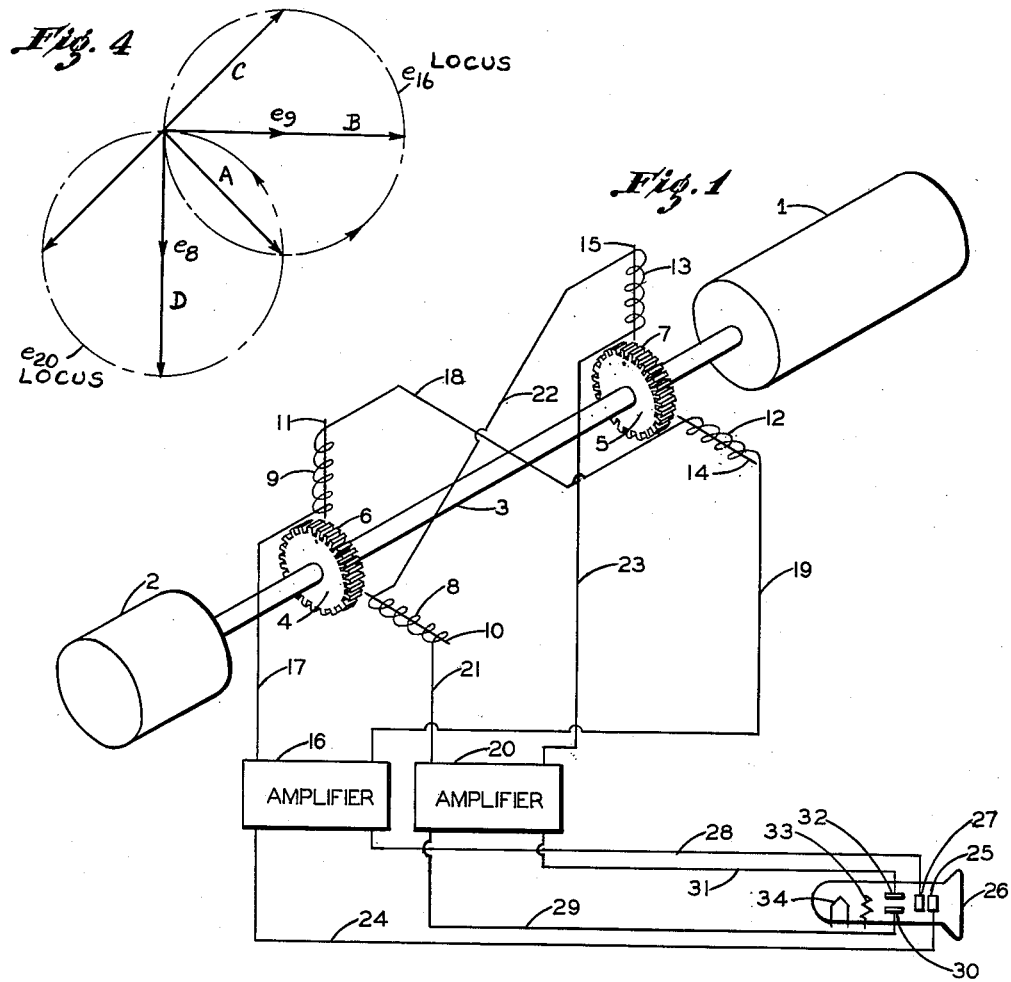
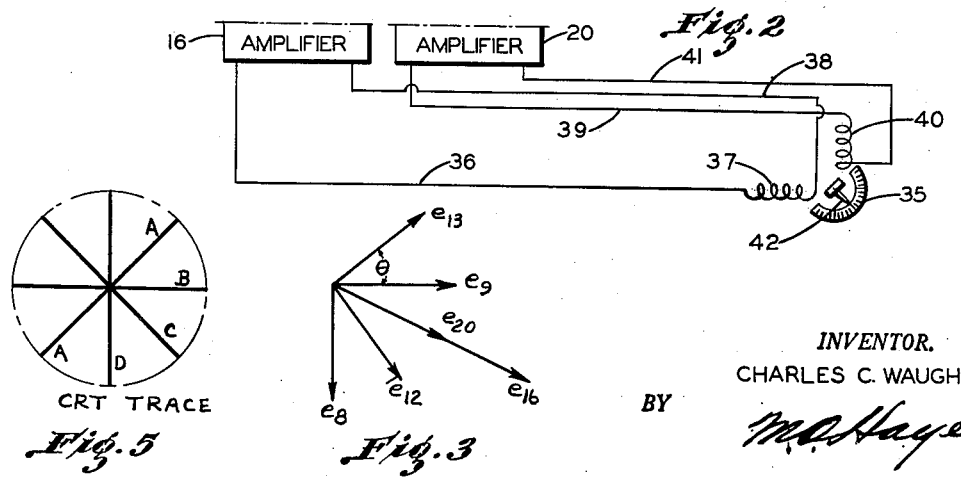
INVENTOR.
CHARLES C. WAUGH
BY
M. O. Hayes
ATTORNEY

UNITED STATES PATENT OFFICE 2,621,514

PHASE SHIFT TORQUE METER

Charles C. Waugh, Newton, Pa.

Application August 15, 1947, Serial No. 768,789

7 Claims. (Cl. 73—136)

(Granted under the act of March 3, 1883, as amended April 30, 1928; 370 O. G. 757)

This invention relates to new and useful improvements in a device for the electrical measurement of the torque developed in a rotating shaft. A typical application may be a rotatively loaded drive shaft connected with a rotative source of power. By the measurement of the torque in said drive shaft and the speed, the power absorbed in moving the load may be determined.

All drive shafts flex or twist under loads and may be calibrated to determine their angular deflection. Then, to measure this torque while the shaft is rotating, an A. C. generator may be mounted at each end of the shaft and a means provided for measuring the phase angle between the output voltage of the two generators. As the shaft twists under a rotative load there is a shift in the phase angle of the two generators, the amount of which is proportional to the torque developed in the shaft connecting the two generators.

The device of this invention starts from this point by providing a means to indicate the shift in phase and translate it into a torque reading in foot-pounds on an indicator. This is accomplished by either of two arrangements both of which use the same principle: (1) a two-phase system for a cathode ray tube indicator; (2) a two-phase system with an electro-magnetic indicator.

In the first arrangement, the two-phase generators may use gear-type rotors; each gear having two coils wound on permanent magnets so disposed with respect to the gears that they generate A. C. voltage. As the gear teeth pass the ends of the magnets, the flux alternately increases and decreases, thus inducing voltage in the coils. The generators incorporate gears rotating between two permanent magnets, for each gear, and, preferably, are designed so that a full load deflection of the shaft connecting the two generators is equivalent to a 360 electrical degree shift in the phase of the generator output; that is, if the two generators are running with no torque in the shaft connecting them and their output voltages are then in phase, then, if a full load torque is applied to the shaft between them, the deflection will result in their output being 360 degrees out of phase.

In the device shown by way of illustration in the drawing the full load deflection of the shaft connecting the two generators is 4½ degrees of the circumference of the shaft. Therefore the generators are designed to give one complete cycle of 360 electrical degrees to every 4½ degrees of shaft rotation. Each tooth of the gear as it passes its magnetic coil, produces one cycle, and as each tooth is 4½ degrees apart, there would then be 80 teeth in each generator gear.

The two coils for each generator gear are arranged so that their voltages are 90 degrees out of phase, thus one lags the other by 90 electrical degrees. The leading voltage at one generator gear is added to the lagging voltage at the other by connecting the coil windings accordingly in series. Thus, two separate circuits, each one consisting of two windings, are made to generate two A. C. output voltages. The output voltage of each of these circuits is amplified separately and then the said voltages are applied to a cathode ray tube. One is applied to the vertical deflection plates, the other to the horizontal deflection plates.

These two voltages will always be either in phase or out of phase by 180 degrees and will vary in magnitude according to the deflection of the shaft connecting the two generators. They will produce a pattern on the screen of the cathode ray tube, which will be a straight line and which will rotate through 180 degrees on the screen as the load is varied in the shaft between the two generators from zero to that of full load.

The torque is then read by means of a transparent scale placed in front of the screen and having annular divisions representing foot-pounds of torque, full torque being represented by 180° of rotation of said line.

The second arrangement uses the same two-phase generator system as the first arrangement, but uses the impressed voltage from each of the two generators to operate an electro-magnetic indicator which consists of two coils mounted at an angle of 90 degrees with each other and with a freely rotating laminated iron core therebetween. To this iron core is attached an indicating pointer so arranged as to travel over and above a scale that has divisions calibrated in foot-pounds of torque, up to a full scale deflection of 180 degrees. This is due to the fact that the laminated iron core aligns itself with the electrical field produced by the two coils of the indicator which are in turn energized by the voltage as produced by the torque changes of the two generator shafts as in the first arrangement.

The principal object of this invention is to provide a device for the electrical measurement of torque as developed in a rotating shaft.

Another object of this invention is to indicate the torque, as developed in a rotating shaft, in foot-pounds by means of a cathode ray tube, so that a pattern is produced on a suitable screen in a straight line that rotates through an arc of 180 degrees and indicates on a scale designating foot-pounds, or other units.

Still another object of this invention is to indicate the torque, as developed in a rotating shaft, in foot-pounds, or other units, by means of an electro-magnetic indicator or a pointer rotating over a scale designating foot-pounds, or other units.

A still further object of this invention is to produce such an indicator so that it will operate with two-phase generators and amplifiers connected to a cathode ray tube.

Still another object of this invention is to produce such an indicator so that it will operate with two-phase generators connected to an electro-magnetic device as the indicating mechanism.

These and other objects of the invention, and the various features and details of the construction, operation and use thereof, are hereinafter more fully set forth and described with reference to the accompanying drawing in which like numbers refer to like parts and in which:

Fig. 1 is a diagrammatic view of a torque measuring device using a cathode ray tube as a torque indicator.

Fig. 2 is a diagrammatic view of a torque measuring device which, when connected to the generating set shown in Fig. 1, indicates torque by means of an electro-magnetic indicator.

Fig. 3 is a vector diagram illustrating an important principle of this invention, namely, that the two voltage sums derived from the generators and applied to the indicator are in phase at all times.

Fig. 4 is a more universal vector diagram similar to Fig. 3, illustrating the loci of the two voltage sums as the phase angle shifts progressively through 360°, due to increasing torsion on the shaft 3.

Fig. 5 is a schematic illustration of a cathode ray trace which would be presented by the voltages of Fig. 4 in the Fig. 1 circuit.

Referring now to the drawing and more particularly to Fig. 1 thereof, numeral 1 designates a driving motor of any type suitable as a source of power, and 2 is the driven load producing the driving torque in the interconnecting shaft 3 and which said torque is to be indicated and measured. Gears 4 and 5 are securely fastened to shaft 3, spaced apart from each other so that the angular deflection of the shaft included therebetween can be indicated and measured, and by means of the device of this invention the torque developed in driving the load can be measured in foot-pounds or other units.

Gears 4 and 5 have 80 teeth 6 and 7, respectively, each. As gear 4 rotates with shaft 3 the teeth 6 of gear 4 pass by coils 8 and 9. The coils 8 and 9 are wound on permanent magnets 10 and 11. As gear 5 rotates with shaft 3 the teeth 7 pass by the two coils 12 and 13 with their respective permanent magnets 14 and 15. Coil 8 and magnet 10 lie in the same plane through the center of shaft 3 as coil 12 with magnet 14. In a like manner coil 9 with magnet 11 lies in the same plane through the center of shaft 3 as coil 13 with magnet 15. When shaft 3 is loaded from zero to full scale torque, the voltages generated in coils 8 and 9 shift with respect to those of coils 12 and 13, respectively, through an electrical phase angle of 360°.

Coil 9 connects at one end with amplifier 16 through wire 17, and at the opposite end to coil 12 through wire 18, and from the opposite end of coil 12, a wire 19 connects to amplifier 16.

Coil 8 connects with amplifier 20 by wire 21, and at the opposite end to coil 13 by wire 22, and the other end of coil 13 connects to amplifier 20 by wire 23.

Amplifier 16 has wire 24 connecting to a vertical plate 25 of cathode ray tube 26 and a second vertical plate 27 is connected by wire 28 back to said amplifier.

Horizontal plate 30 connects by wire 29 to amplifier 20; and horizontal plate 32 connects to amplifier 20 by wire 31. In the cathode ray tube 26, numeral 33 designates the anode and 34 the heater.

Referring now to Fig. 2 of the drawing, amplifiers 16 and 20 are connected to the two-phase generators as in Fig. 1 and are also connected to an electro-magnetic indicator 35 by wire 36 from amplifier 16 through electro-magnet coil 37 and wire 38 back to amplifier 16. Amplifier 20 is also connected to electro-magnetic indicator 35 by wire 39 through electro-magnetic coil 40 and wire 41 back to amplifier 20. The indicator hand 42 is operated by the pull of electro-magnet coils 37 and 40 and so calibrated as to read foot-pounds of torque as applied to shaft 3, Fig. 1.

To summarize:

The two-phase generators, as shown, use gears as rotors, with two coils wound on permanent magnets to generate the alternating current voltage. As the gear teeth pass the ends of the magnets, the flux is alternately increased and decreased thus inducing a voltage in the coil.

The generators are designed so that full load deflection of the shaft is equivalent to 360 electrical degrees shift in the output. That is, if the two generators are running with no torque in the shaft, and their output voltages are in phase, then if full load torque is applied to the shaft, the deflection will result in their outputs being 360 degrees out of phase.

Full load deflection for the shaft is 4½ mechanical degrees in the design, therefore the generator must be designed to give one complete cycle, or 360 electrical degrees for every 4½ degrees of rotation. Since each tooth of the gear produces one cycle, the teeth are 4½ degrees apart, making 80 teeth.

The two coils of each generator are arranged so that their voltages are 90 degrees apart, that is, one lags the other by 90 electrical degrees. The leading voltage of one generator is added to the lagging voltage of the other, by connecting the proper windings in series. This makes two separate circuits, each one consisting of two windings, one on each generator. The output voltages of these circuits are amplified separately and then applied to a cathode ray tube, one to the vertical deflection plates, and the other to the horizontal. As will be shown below, these two voltages will always be either in phase or 180 degrees out of phase, and each will vary in magnitude according to the deflection of the shaft.

Referring to the vector diagram of Fig. 3, the voltages generated in the coils 8 and 9 are shown as $e_8$ and $e_9$, respectively, with $e_8$ lagging $e_9$ by 90°. Similarly, $e_{12}$ always lags $e_{13}$ by 90°. With no deflection in the shaft, the rotors 4 and 5 may be so adjusted that $e_{13}$ is exactly in phase with $e_9$. As will be readily seen hereinafter, such adjustment of the rotor is not necessary to the functioning of the device, but is assumed at this time for ease of explanation. If now a torque in the shaft 3 produces deflection between the rotors 4 and 5, resulting in an electrical phase shift of $\theta$ between $e_9$ and $e_{13}$, the vector diagram will assume the attitude shown in Fig. 3.

Amplifier 16 will then receive a voltage which is the sum of $e_9$ and $e_{12}$, this voltage being denoted $e_{16}$ in Fig. 3. Similarly, amplifier 20 will receive the sum of $e_8$ and $e_{13}$, designated $e_{20}$ in Fig. 3. The attitudes or phase dispositions of $e_{20}$ and $e_{16}$ will be always congruent as shown in Fig. 3, and will at all times bisect the angle between $e_9$ and $e_{12}$, which is also the bisector of the angle between $e_8$ and $e_{13}$. It will be readily evident that for all values of $\theta$, $e_{16}$ and $e_{20}$ are always in phase (180° out of phase, if the signs or polarities of the two voltages are different).

Referring now to Fig. 4, there is shown the entire locus of $e_{16}$ and the entire locus of $e_{20}$ plotted for a full 360° of electrical phase shift between $e_9$ and $e_{13}$. In position A, the voltages $e_9$ and $e_{13}$ are in phase, as are the voltages $e_8$ and $e_{12}$. Therefore $e_9$ and $e_{12}$ add up to produce $e_{16}$, and $e_8$ and $e_{13}$ add up to produce $e_{20}$, both $e_{16}$ and $e_{20}$ being equal in magnitude and of the same sign, as shown at A in Fig. 4.

In position B, the torsion in shaft 3 has shifted $e_{13}$ to a position 90 electrical degrees ahead of $e_9$, producing $e_{16}$ as shown at B, with $e_{20}$ dropping to zero.

Further torsion produces an added 90° phase shift with $e_{16}$ and $e_{20}$ becoming of equal magnitude and opposite in polarity or sign, as shown at C in Fig. 4. Position C of Fig. 4 illustrates that while $e_{16}$ and $e_{20}$ are still exactly in phase, their polarities or signs are now different. This may be expressed either as a relation: in-phase with opposite polarity, or as a relation: 180° out-of-phase.

In similar manner, increasing torque produces position D, and finally full load torque on the shaft 3 has produced a full 360° shift between $e_9$ and $e_{13}$ to reinstate condition A of Fig. 4.

Fig. 5 illustrates schematically the four traces which would be obtained from the four discrete, illustrative positions chosen in Fig. 4, such traces being obtained on the cathode ray tube screen 26. It will be readily seen that for a 360° electrical shift between voltages $e_9$ and $e_{13}$, there is a 180° sweep of the cathode ray trace from A through B, C, and D, back to a position congruent with the original A trace. If desired, a transparent scale may be placed over the cathode ray screen through the 180° sweep of the trace, the scale being marked with divisions representing foot-pounds of torque. It will be readily seen that the relation between torque and trace deflection is a linear one.

While a particular embodiment of this invention has been illustrated and described herein, it is not intended that this invention be limited to such disclosure, and changes and modifications may be made and incorporated within the scope of the claims.

The invention described herein may be manufactured and used by or for the Government of the United States of America for governmental purposes without the payment of any royalties thereon or therefor.

What is claimed is:

1. A torque indicator comprising a portion of the drive shaft through which said torque is transmitted, having a known specific torsional deflection, a generator having a generator rotor fixed to said shaft at each end of said portion, a pair of field coils in each generator arranged so that the rotor will induce an A. C. current in them having a 90 degree difference in phase between them, a pair of circuits, one of which includes the leading current coil of one generator and the lagging current coil of the other in series, the other of which includes the remaining two coils in series, thus providing a pair of A. C. outputs either in phase or out of phase by 180 degrees at all times, means for comparing the outputs of said two circuits, and means responsive to the operation of said comparing means to indicate the amount of torque in accordance with the difference in said outputs.

2. A torque indicator comprising a portion of the drive shaft through which said torque is transmitted, having a known specific torsional deflection, a generator having a generator rotor fixed to said shaft at each end of said portion, a pair of field coils in each generator arranged so that the rotor will induce an A. C. current in them having a 90 degree difference in phase between them, a pair of circuits, one of which includes the leading current coil of one generator and the lagging current coil of the other in series, the other of which includes the remaining two coils in series, thus providing a pair of A. C. outputs either in phase or out of phase by 180 degrees at all times, means for comparing the outputs of said two circuits, and means responsive to the operation of said comparing means to indicate the amount of torque in accordance with the relative phase and the strength of said outputs.

3. A torque indicator comprising a portion of the drive shaft through which said torque is transmitted, having a known specific torsional deflection, a generator having a generator rotor fixed to said shaft at each end of said portion, a pair of field coils in each generator arranged so that the rotor will induce an A. C. current in them having a 90 degree difference in phase between them, a pair of circuits, one of which includes the leading current coil of one generator and the lagging current coil of the other in series, the other of which includes the remaining two coils in series, thus providing a pair of A. C. outputs either in phase or out of phase by 180 degrees at all times, and simultaneously varying inversely in strength between a maximum and zero, a cathode ray tube, and means for impressing said outputs on the vertical and horizontal plates of said tube, whereby a line trace is obtained on the screen of said tube indicating by its angular position the amount of torque being transmitted.

4. A torque indicator comprising a portion of the drive shaft through which said torque is transmitted, having a known specific torsional deflection, a generator having a generator rotor fixed to said shaft at each end of said portion, a pair of field coils in each generator arranged so that the rotor will induce an A. C. current in them having a 90 degree difference in phase between them, a pair of circuits, one of which includes the leading current coil of one generator and the lagging current coil of the other in series, the other of which includes the remaining two coils in series, thus providing a pair of A. C. outputs either in phase or out of phase by 180 degrees at all times, and simultaneously varying inversely in strength between a maximum and zero, indicator means operated in response to changes in said outputs to show the amount of torque being transmitted.

5. A torque indicator as defined in claim 4, wherein said indicator means is a rotatably mounted magnet having a pointer moving over a calibrated torque scale, and coils positioned at right angles acting on said magnet and connected to said outputs respectively.

6. A torque indicator as defined in claim 5, wherein a suitable amplifying means is provided for said outputs.

7. Apparatus for indicating phase difference between two recurrent phenomena having the same frequency, comprising a pair of first voltage means for deriving from the first phenomenon a pair of first voltages, one a leading voltage, the other a 90° lagging voltage, a pair of second voltage means for deriving from the second phenomenon a pair of second voltages, one a leading voltage, the other a 90° lagging voltage, a pair of electrical circuits, one connecting said first leading voltage means with said second lagging voltage means to derive the algebraic sum of said first leading voltage and said second lagging voltage, the other connecting said first lagging voltage means with said second leading voltage means to derive the algebraic sum of said first lagging voltage and said second leading voltage, whereby said derived voltage sums are in phase or 180° out of phase with each other at all times, and means connected to said circuits for combining said voltage sums to indicate phase displacement between said two phenomena.

CHARLES C. WAUGH.

REFERENCES CITED

The following references are of record in the file of this patent:

UNITED STATES PATENTS

| Number | Name | Date |
|---|---|---|
| 1,111,848 | McCoy et al. | Sept. 29, 1914 |
| 1,685,964 | Smith | Oct. 2, 1928 |
| 2,193,079 | Schrader | Mar. 12, 1940 |
| 2,306,361 | Stuart | Dec. 22, 1942 |
| 2,349,663 | Langer | May 23, 1944 |

FOREIGN PATENTS

| Number | Country | Date |
|---|---|---|
| 326,436 | Germany | Sept. 29, 1920 |
| 390,632 | Germany | Feb. 21, 1924 |